US012746718B2

(12) United States Patent
Le et al.

(10) Patent No.: US 12,746,718 B2
(45) Date of Patent: Sep. 29, 2026

(54) METHOD FOR PRODUCING A PARTIALLY RECYCLED POLYARYLETHERKETONE POWDER BY SINTERING

(71) Applicant: Arkema France, Colombes (FR)

(72) Inventors: Guillaume Le, Serquigny (FR); Benoît Brule, Serquigny (FR); Christophe Caremiaux, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 578 days.

(21) Appl. No.: 17/439,126

(22) PCT Filed: Mar. 13, 2020

(86) PCT No.: PCT/FR2020/050535
§ 371 (c)(1),
(2) Date: Sep. 14, 2021

(87) PCT Pub. No.: WO2020/188202
PCT Pub. Date: Sep. 24, 2020

(65) Prior Publication Data

US 2022/0145039 A1 May 12, 2022

(30) Foreign Application Priority Data

Mar. 15, 2019 (FR) ...................................... 1902658

(51) Int. Cl.
*B29C 64/153* (2017.01)
*B29C 64/357* (2017.01)
(Continued)

(52) U.S. Cl.
CPC .......... *B29C 64/153* (2017.08); *B29C 64/357* (2017.08); *B33Y 10/00* (2014.12); (Continued)

(58) Field of Classification Search
None
See application file for complete search history.

(56) References Cited

U.S. PATENT DOCUMENTS 10,556,379 B2 * 2/2020 DeFelice ................ B33Y 40/00
10,882,215 B2 * 1/2021 Pedicini .................. B29B 13/02
(Continued)

FOREIGN PATENT DOCUMENTS

CN 107674389 A 2/2018
EP 3272788 A1 1/2018
(Continued)

OTHER PUBLICATIONS

International Search Report (PCT/ISA/210) and Written Opinion (PCT/ISA/237) mailed on Jul. 31, 2020, by the French Patent Office as the International Searching Authority for International Application No. PCT/FR2020/050535.
(Continued)

*Primary Examiner* — Benjamin A Schiffman
(74) *Attorney, Agent, or Firm* — Boone IP Law

(57) ABSTRACT

A process for the layer-by-layer manufacture of a three-dimensional object by sintering of a powder based on PAEK(s) with electromagnetic radiation, wherein the powder includes at least one PAEK and at least one phosphate, said powder being, at least in part, a recycled powder. The recycled powder is obtainable by continuous or discontinuous heating, over a period of at least six hours, of a powder of the same composition at a constant or nonconstant temperature, strictly between the glass transition temperature, Tg, and the melting temperature, Tm, of the powder. Also, an article obtained by this process and to uses of phosphate(s) in compositions based on PAEK(s).

18 Claims, 2 Drawing Sheets

(51) Int. Cl.

| | |
|---|---|
| ***B33Y 10/00*** | (2015.01) |
| ***B33Y 30/00*** | (2015.01) |
| ***B33Y 40/00*** | (2020.01) |
| ***B33Y 70/00*** | (2020.01) |
| ***C08J 11/12*** | (2006.01) |
| ***C08K 3/32*** | (2006.01) |
| ***C09D 7/48*** | (2018.01) |
| ***C09D 7/61*** | (2018.01) |
| ***C09D 171/00*** | (2006.01) |
| *B29C 64/268* | (2017.01) |
| *B29K 71/00* | (2006.01) |
| *B29K 105/26* | (2006.01) |

(52) U.S. Cl.

CPC ............... *B33Y 30/00* (2014.12); *B33Y 40/00* (2014.12); *B33Y 70/00* (2014.12); *C08J 11/12* (2013.01); *C08K 3/32* (2013.01); *C09D 7/48* (2018.01); *C09D 7/61* (2018.01); *C09D 171/00* (2013.01); *B29C 64/268* (2017.08); *B29K 2071/00* (2013.01); *B29K 2105/26* (2013.01); *C08J 2371/10* (2013.01); *C08K 2003/324* (2013.01); *Y02W 30/62* (2015.05)

(56) References Cited

U.S. PATENT DOCUMENTS

| | | | | |
|---|---|---|---|---|
| 10,906,207 | B2 * | 2/2021 | Mathieu | C08J 3/12 |
| 10,988,596 | B2 * | 4/2021 | Le | C08K 5/521 |
| 11,697,718 | B2 * | 7/2023 | Brule | C08J 5/10<br>523/207 |
| 11,746,188 | B2 * | 9/2023 | Brule | B33Y 70/00<br>264/497 |
| 2013/0217838 | A1 | 8/2013 | Defelice et al. | |
| 2018/0208741 | A1 | 7/2018 | Le et al. | |
| 2018/0243979 | A1 | 8/2018 | Defelice et al. | |
| 2021/0394438 | A1 * | 12/2021 | Louis | B33Y 70/00 |
| 2024/0010835 | A1 * | 1/2024 | Brulé | C08G 65/46 |

FOREIGN PATENT DOCUMENTS

| | | | | |
|---|---|---|---|---|
| EP | 2776224 | B1 | 8/2019 | |
| GB | 2536387 | A | 9/2016 | |
| JP | 2018196983 | A | 12/2018 | |
| WO | WO-2017013368 | A1 * | 1/2017 | C08G 65/40 |
| WO | 2017116885 | A1 | 7/2017 | |
| WO | 2017149233 | A1 | 9/2017 | |
| WO | 2018185440 | A1 | 10/2018 | |
| WO | 2020099444 | A1 | 5/2020 | |

OTHER PUBLICATIONS

Notice of Reasons for Rejection with English translation only, mailed on Nov. 27, 2023, by the Japan Patent Office (JPO) for Japanese Application No. 2021-555519, 6 pages.

Second Office Action, mailed on Apr. 4, 2024, by the Chinese National Intellectual Property Administration for Chinese Application No. 202080021596.7, 16 pages.

Third Office Action, English translation only, mailed on Jul. 3, 2024, by the Chinese National Intellectual Property Administration for Chinese Application No. 202080021596.7, 13 pages.

Li Liu, et al., "Wave-transmitting materials for radome," Metallurgical industry press, Jun. 30, 2008, pp. 203-205.

Anping Li, et al., "Principle and Safe Use of Food Additives," National Defense Science and Technology University Press, Sep. 30, 2011, pp. 96-97.

A concise explanation of the relevance may be found in the English translation of the Third Office Action of the Chinese Application No. 202080021596.7 (submitted herewith).

* cited by examiner

[Fig.1]
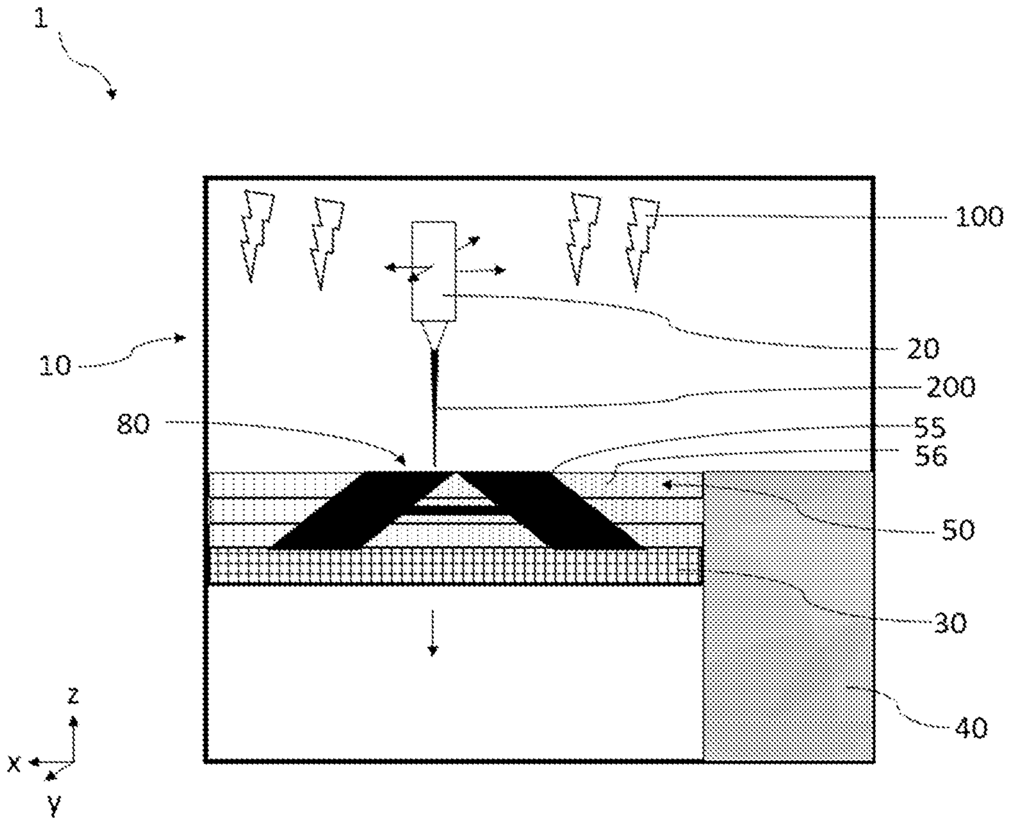
[Fig. 2]
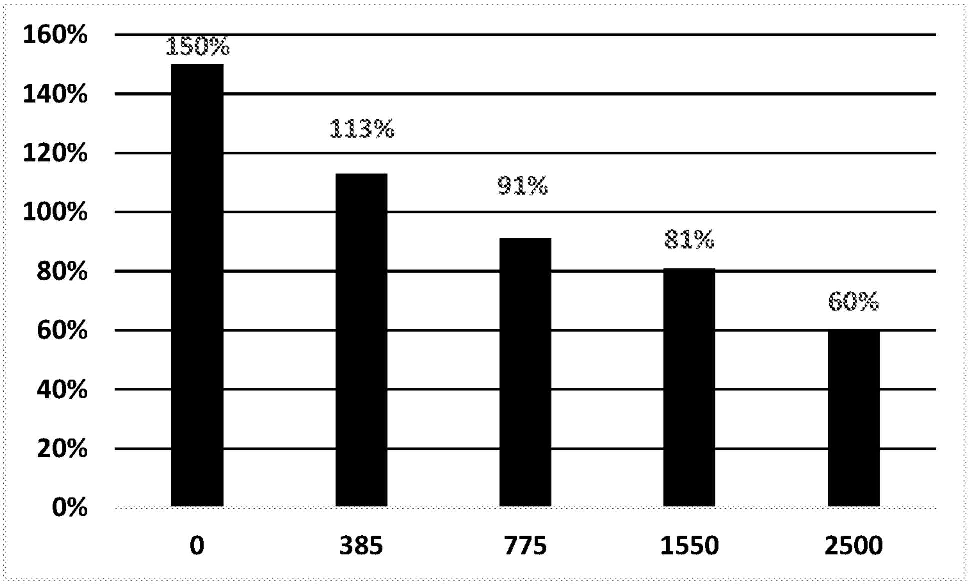

[Fig. 3]
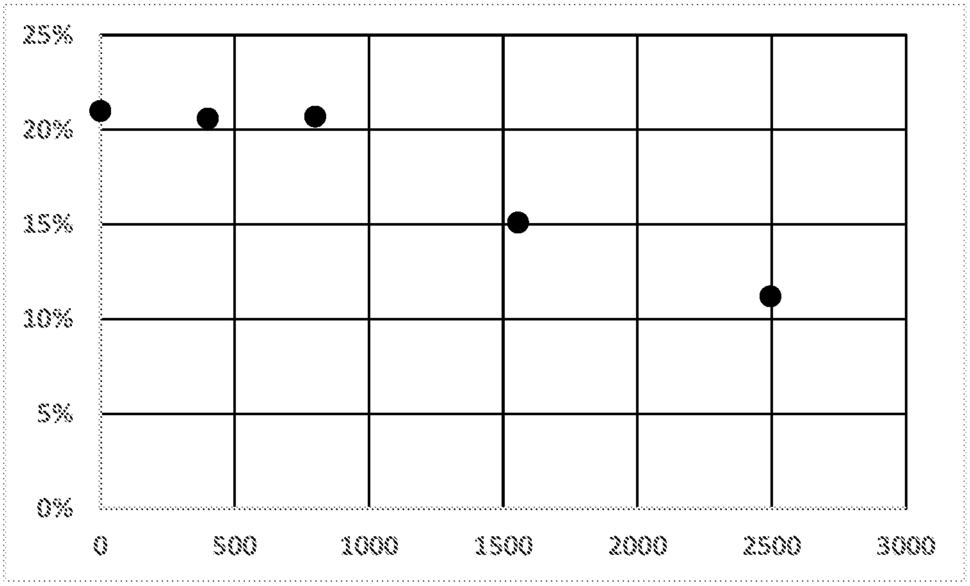

METHOD FOR PRODUCING A PARTIALLY RECYCLED POLYARYLETHERKETONE POWDER BY SINTERING

CROSS-REFERENCE TO RELATED APPLICATION

The present application is a U.S. National Stage of International Application No. PCT/FR2020/050535, filed on Mar. 13, 2020, which claims the benefit of French Application No. 1902658, filed on Mar. 15, 2019.

BACKGROUND OF THE INVENTION

Field of Invention

The technical field of the invention is that of processes for powder sintering with electromagnetic radiation, in particular laser powder sintering processes.

In particular, the invention relates to the use of a powder that includes a composition based on PAEK(s), the powder being at least partly recycled, in a process for sintering by electromagnetic radiation.

The electromagnetic radiation may be a laser beam, in the case of laser sintering, infrared radiation or UV radiation or any other source of radiation. In the present description, the term "sintering" includes all these processes, irrespective of the type of radiation.

Description of Related Art

Polyaryletherketones are well-known high-performance engineering polymers. They may be used for applications which are restrictive in terms of temperature and/or in terms of mechanical constraints, or even chemical constraints. They may also be used for applications requiring excellent fire resistance and little emission of fumes and other toxic gases. Finally, they have good biocompatibility. These polymers are found in fields as varied as the aeronautical and aerospace sector, offshore drilling, motor vehicles, the railroad sector, the marine sector, the wind power sector, sport, construction, electronics or medical implants. They may be used in all the technologies in which thermoplastics are used, such as molding, compression, extrusion, spinning, powder coating or sinter prototyping. In the case of powder sintering with electromagnetic radiation, a large portion of the powder is not used during the construction of a three-dimensional object. The construction of a three-dimensional object is also denoted by the term: "run". Typically, around 85-90% by weight of the powder introduced into the sintering machine is not touched by the electromagnetic radiation during construction of a three-dimensional object. It therefore appears essential, for economic reasons, to be able to reuse this powder, i.e. to recycle it, during the next construction(s) or run(s).

In general, during laser sintering construction, the PAEK powder of a layer under construction is heated in a construction environment to a temperature Tc, known as the "construction temperature". The temperature of the layers below the layer under construction may be equal to Tc in the case where the chamber is maintained at a uniform temperature. Nevertheless, in the majority of cases, the temperature of the layers below the layer under construction is slightly lower than the construction temperature, by around a few degrees to a few tens of degrees. The lower part of the construction environment can in particular be temperature regulated so that the lowest layers cannot cool to a temperature below a temperature Tb, commonly known as "tank bottom temperature". The construction temperature, and if applicable the tank bottom temperature, are between the glass transition temperature Tg and the melting temperature Tm of the PAEK powder.

Thus, during a construction by sintering, the surrounding powder, i.e. the powder not touched by the electromagnetic radiation, remains for several hours, typically 6 hours, or even several tens of hours depending on the complexity of the part to be constructed, at temperatures between the glass transition temperature and the melting temperature of the powder, which can lead to a change in the structure of the constituent polymer of the powder, in particular with an increase in its molecular mass, and a change in its color.

The increase in molecular mass leads to an increase in viscosity which becomes an impediment to the coalescence between the powder grains during the successive runs. It is then difficult or even impossible to recycle the powder since either it becomes impossible to sinter the powder or the mechanical properties of the three-dimensional part, obtained by sintering of such a recycled powder, are thereby diminished and are insufficient due to the presence, for example, of porosities in the sintered parts.

The change in color, in particular its yellowing, is moreover not desired in many industrial applications. However, over long periods in the presence of oxygen, the powders can also change color. It is then difficult to obtain objects that have a homogeneous and uniform color.

There are currently PAEK powders on the market, such as those sold under the reference PEEK HP3 by the company EOS, which can be used in laser sintering. However, these powders undergo such thermal degradation starting from the first run, in particular a large increase in their average molecular mass, that it is not possible to reuse them for a second construction of a three-dimensional object. Consequently, the manufacture of three-dimensional objects by sintering these powders is much too expensive and cannot be envisaged on an industrial scale. Document US 2013/0217838 proposes a solution in order to be able to recycle a PAEK powder used in laser sintering. It describes more particularly the possibility of recycling a PEKK powder, provided that the construction temperature is increased from 285° C. to 300° C. and the power of the laser beam is increased each time the powder is recycled, during successive runs. This document in fact states that the PEKK powder used is not temperature stable and that its melting temperature increases after its first use in a sintering process. In order to be able to counter this instability of the powder, the parameters of the sintering machine are modified. The power of the laser beam, in particular, is increased with each run. The fact of having to change these sintering parameters for each run slows down the industrial production and makes it more difficult. Furthermore, it appears difficult to mix unrecycled powder with a recycled powder, since the construction parameters are then complex to adjust. Finally, the fact of having to modify the parameters for each run, and in particular increase the construction temperature, leads to a degradation of the polymer powder, to the extent that the number of recycles of the powder still remains too limited and it would be economically advantageous to be able to recycle it more.

Document WO 2017/149233 describes a PAEK powder capable of being used several times in sintering processes owing to an isothermal heat pretreatment at a constant temperature of between 260° C. and 290° C. for a period of between 5 minutes and 120 minutes. The isothermal heat pretreatment has the advantage of stabilizing the melting temperature of the powder and of being able to recycle it when it is used in laser sintering at least over a few runs. This technique does however make it possible to recycle the powder over a large number of runs. Another disadvantage is that the powder rapidly turns yellow in the course of the recycling operations compared to the color of the virgin powder.

BRIEF SUMMARY OF THE INVENTION

The aim of the invention is to overcome at least one of the drawbacks of the prior art.

In particular, the aim of the invention is to provide an improved powder sintering manufacturing process using electromagnetic radiation in which the powder used during a run is, at least in part, a recycled powder.

The aim of the invention is in particular to provide a sintering manufacturing process, the parameters of which change little, or even remain unchanged, irrespective of the number of recycles of the recycled powder and irrespective of the proportion of recycled powder in the powder used.

Another aim of the invention is to provide a three-dimensional article, obtainable by such a process, having mechanical properties that are satisfactory and substantially constant irrespective of the number of recycles of the recycled powder and irrespective of the proportion of recycled powder in the powder used. Another aim of the invention is to provide a three-dimensional article, obtainable by such a process, the colour of which is substantially the same, irrespective of the number of recycles of the recycled powder and irrespective of the proportion of recycled powder in the powder used.

The invention relates to a process for the layer-by-layer manufacture of a three-dimensional object by sintering of a powder with electromagnetic radiation. The powder is a powder based on polyaryletherketone(s) (PAEK(s)) and comprises at least one PAEK and at least one phosphate. The powder is, at least in part, a recycled powder, i.e. obtainable by continuous or discontinuous heating, over a period of at least six hours, of a powder of the same composition at a constant or nonconstant temperature, strictly between the glass transition temperature, Tg, and the melting temperature, Tm, of the powder.

The inventors have demonstrated that the use of phosphate(s) in a composition based on PAEK(s) makes it possible to thereby stabilize the color, the viscosity and/or the average molecular mass when the composition is heated, continuously or discontinuously, at a constant or nonconstant temperature, strictly between the glass transition temperature and the melting temperature of the powder. Stabilization in this temperature range is effective over a period of at least six hours.

In certain embodiments, the recycled powder originates from the recycling of a powder from at least one previous layer-by-layer construction of a three-dimensional object by powder sintering with electromagnetic radiation, the sintering of the layers of the previous construction being carried out at a construction temperature Tc. Moreover, at least one portion of the recycled powder may originate from at least two recyclings, or from at least three recyclings, or from at least five recyclings, or from at least ten recyclings, or from at least twenty-five recyclings, or from at least fifty recyclings, or from at least one hundred recyclings of previous layer-by-layer constructions of three-dimensional objects by powder sintering with electromagnetic radiation.

In certain embodiments, Tc is between (Tf−50°) C. and (Tf−10°) C., limits included. In certain embodiments, Tc is between (Tg+20°) C. and (Tg+70°) C., limits included. In certain embodiments, the powder originating from at least one previous layer-by-layer construction of a three-dimensional object by powder sintering with electromagnetic radiation, has been subjected to a temperature varying from the construction temperature Tc to a temperature above or equal to (Tc−40°) C., preferably varying from the construction temperature Tc to a temperature above or equal to (Tc−25°) C., and more preferably varying from the construction temperature Tc to a temperature above or equal to (Tc−10°) C., during the construction period of the previous construction.

In certain embodiments, the powder comprises at least 30%, preferentially at least 40%, and very preferentially at least 50% by total weight of powder, of recycled powder.

In certain embodiments, said at least one phosphate is a salt. Preferably, the phosphate salt may be selected from the group consisting of: phosphate salts of ammonium, sodium, calcium, zinc, potassium, aluminum, magnesium, zirconium, barium, lithium, rare-earth elements, and a mixture thereof.

In certain embodiments, the phosphate salt may be an organometallic phosphate salt. The phosphate salt may in particular have the following formula:

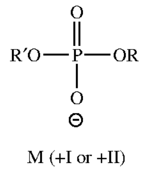

wherein R is identical to or different from R', R and R' being formed by one or more aromatic groups which are optionally substituted by one or more groups having from 1 to 9 carbons, it being possible for R and R' to be bonded to one another or separated by at least one group chosen from the following groups: $—CH_2—$; $—C(CH_3)_2—$; $—C(CF_3)_2—$; $—SO_2—$; —S—, —CO—; and —O— and wherein M represents an element from group IA or IIA of the Periodic Table.

In certain embodiments, said phosphate salt is a salt of $H_2PO_4^-$, $$HPO_4^{2-}, PO_4^{3-},$$

or a mixture thereof, preferentially having a sodium ion, a potassium ion or a calcium ion as counterion. In particular, the phosphate salt may be monosodium phosphate.

The powder comprises at least 50% by weight of PAEK relative to the total weight of said powder. In certain embodiments, the powder comprises at least 75%, or at least 80%, or at least 85%, or at least 90%, or at least 92.5%, or at least 95%, or at least 97.5%, or at least 98%, or at least 98.5%, or at least 99%, or at least 99.5% by weight of PAEK relative to the total weight of said powder.

In certain embodiments, the proportion of said at least one phosphate in the powder is greater than or equal to 500 ppm, or greater than or equal to 750 ppm, or greater than or equal to 1000 ppm, or greater than or equal to 1500 ppm, or greater than or equal to 2000 ppm, or greater than or equal to 2500 ppm.

In certain embodiments, said at least one PAEK is selected from the group consisting of: polyetherketoneketone (PEKK), polyetheretherketone (PEEK), polyetheretherketoneketone (PEEKK), polyetherketoneetherketoneketone (PEKEKK), polyetheretheretherketone (PEEEK), polyetherdiphenyletherketone (PEDEK), copolymers thereof and mixtures thereof. Said at least one PAEK may in particular be a polyetherketoneketone (PEKK).

In certain embodiments, the powder comprises at least two PAEKs, more particularly PEKK, and in addition to the PEKK, at least one of the following polymers: PEK, PEEKEK, PEEK, PEEKK, PEKEKK, PEEEK, PEDEK, with a content of less than 50% by weight of the total weight of said composition, preferably less than or equal to 30% by weight of the composition.

In certain embodiments, a virgin powder, which has never been recycled and is capable of being recycled, is obtained by dry blending or by wet impregnation, preferentially by wet impregnation, of a phosphate-free composition comprising at least 50% by weight relative to the total weight of composition with said phosphate(s).

The present invention also relates to a three-dimensional article obtainable from a process as stated above.

Finally, the present invention relates to the use of phosphate(s) in a composition based on PAEK(s), comprising at least 50% by weight, relative to the total weight of powder, of at least one PAEK, in order to stabilize the color and/or the average molecular mass of the composition, when the latter is heated at a temperature strictly between the glass transition temperature and the melting temperature of the composition for a period of at least 6 hours.

BRIEF DESCRIPTION OF THE SEVERAL VIEWS OF THE DRAWINGS

The invention will be understood more clearly with regard to the detailed description that follows of non-limiting embodiments of the invention and to the following figures:

FIG. 1 schematically represents a device for carrying out the process for the layer-by-layer construction of a three-dimensional object by sintering, according to the invention.

FIG. 2 represents the variation in the yellowness index (D65), also denoted "YI (D65)" of a PEKK-based composition heated at 285° C. for seven days under a nitrogen atmosphere, for various contents of phosphate in the composition (x-axis).

FIG. 3 represents the variation in the viscosity of the same PEKK-based composition heated at 285° C. for seven days under a nitrogen atmosphere, for various contents of phosphate in the composition (x-axis).

DETAILED DESCRIPTION OF THE INVENTION

Definitions

The term "glass transition temperature", written as Tg, is understood to denote the temperature at which an at least partially amorphous polymer changes from a rubbery state to a glassy state, or vice versa, as measured by differential scanning calorimetry (DSC) according to the standard NF ISO 11357, part 2, using a heating rate of 20° C./min. In the present invention, when reference is made to a glass transition temperature, this is more particularly, unless otherwise indicated, the glass transition temperature at step midpoint as defined in this standard. The powders based on PAEK(s) in the present invention may optionally exhibit several glass transition steps in the DSC analysis, in particular due to the presence of several PAEKs. In this case, the glass transition temperature is understood to mean the glass transition temperature corresponding to the highest temperature glass transition step.

The term "melting temperature", written as Tm, is understood to denote the temperature at which an at least partially crystalline polymer changes to the viscous liquid state, as measured by differential scanning calorimetry (DSC) according to the standard NF EN ISO 11357, part 3, with a heating rate of 20° C./min. In the present invention, when reference is made to a melting temperature, this is more particularly, unless otherwise indicated, the peak melting temperature as defined in this standard. The powders based on PAEK(s) in the present invention may optionally exhibit several melting peaks in the DSC analysis, in particular due to the presence of various crystalline forms for a PAEK and/or due to the presence of several different PAEKs. In this case, the melting temperature of the powder is understood to mean the melting temperature corresponding to the highest temperature melting peak.

The term "average molecular mass" is understood to denote the weight-average molecular mass of a macromolecule of a polymer.

The term "viscosity" is understood to denote the viscosity number as measured in solution at 25° C. in a 96 wt % sulfuric acid aqueous solution, according to the standard ISO 307.

The term "yellowness index" or "YI" is understood to denote the chromatic deviation from colorless or white to yellow measured according to standard ASTM E313-96 with D65 as illuminant. This index can be measured using a Konica Minolta CM-3610d spectrophotometer.

The term "polymer blend" is intended to denote a macroscopically homogeneous polymer composition. The term also covers such compositions composed of mutually immiscible phases dispersed at the micrometric scale.

The term "copolymer" is intended to denote a polymer derived from the copolymerization of at least two chemically different types of monomer, referred to as comonomers. A copolymer is thus formed from at least two repeating units. It may also be formed from three or more repeating units.

The term "stabilize" is understood to denote the fact of allowing some of the physicochemical properties, in particular the average molecular mass, the viscosity or the color, of a polymer to vary only within a limited range when it is heated at a temperature between its glass transition temperature and its melting temperature.

In all the ranges set out in the present patent application, the limits are included, unless otherwise mentioned.

Polyaryletherketones

The polyaryletherketones (PAEKs) of the powders used in the process according to the invention comprise units of the following formulae:

$$(\text{—Ar—X—}) \text{ and } (\text{—Ar}_1\text{—Y—})$$

wherein:

Ar and $Ar_1$ each denote a divalent aromatic radical;

Ar and $Ar_1$ may preferably be chosen from 1,3-phenylene, 1,4-phenylene, 4,4'-biphenylene, 1,4-naphthylene, 1,5-naphthylene and 2,6-naphthylene;

X denotes an electron-withdrawing group; it may preferably be selected from the carbonyl group and the sulfonyl group, Y denotes a group chosen from an oxygen atom, a sulfur atom, an alkylene group such as $-CH_2-$ and isopropylidene.

In these X and Y units, at least 50%, preferably at least 70% and more particularly at least 80% of the X groups are a carbonyl group, and at least 50%, preferably at least 70% and more particularly at least 80% of the Y groups represent an oxygen atom.

According to a preferred embodiment, 100% of the X groups denote a carbonyl group and 100% of the Y groups represent an oxygen atom.

More preferentially, the polyaryletherketone (PAEK) may be selected from:

a polyetherketoneketone, also referred to as PEKK, comprising in particular units of formula I A (also known as: “I unit”, for instance isophthalic unit), or of formula I B (also referred to as: “T unit”, for instance terephthalic unit), or a mixture thereof:

Formula I A

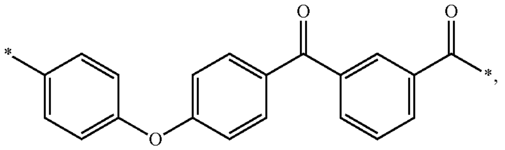

Formula I B

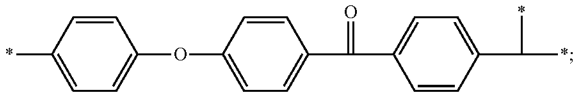

a polyetheretherketone, also referred to as PEEK, comprising units of formula IIA, or of formula IIB, or of formula IIC, or of formula IID or a mixture thereof:

Formula II A

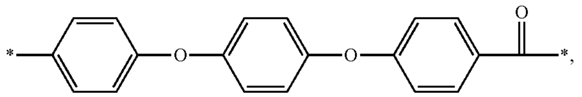

Formula II B

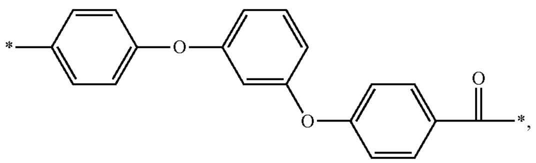

Formula II C

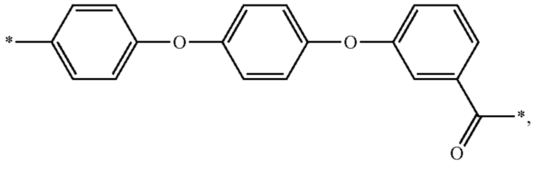

-continued

Formula II D

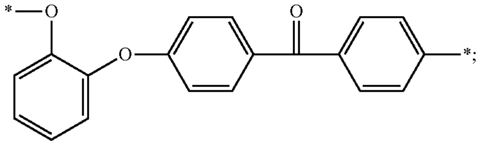

a polyetherketone, also referred to as PEK, comprising units of formula III A, or of formula III B, or of formula III C or a mixture thereof:

Formula III A

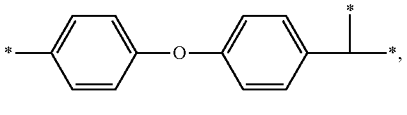

Formula III B

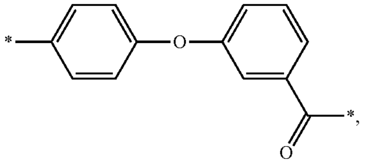

Formula III C

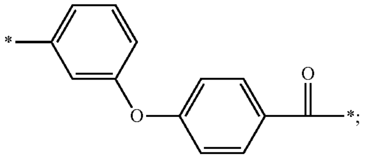

a polyetheretherketoneketone, also referred to as PEEKK, comprising in particular units of formula IV:

Formula IV

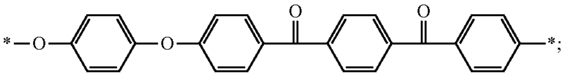

a polyetheretheretherketone, also referred to as PEEEK, comprising in particular units of formula V:

Formula V

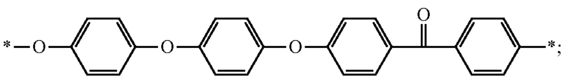

and, a polyetherdiphenyletherketone, also referred to as PEDEK, comprising in particular units of formula VI:

Formula VI

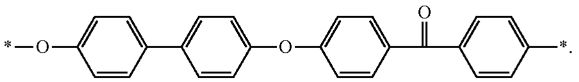

In the above unit formulae, other arrangements of the carbonyl group and of the oxygen atom in the meta or para position of the phenylene groups have not been shown but are also possible.

In the above unit formulae, other arrangements in which a diphenyl group replaces a phenyl group have not been shown but are also possible. The diphenyl group consists of two phenylene groups connected together, it being possible for each phenylene to be of 1,3 or 1,4 type.

The PAEK may also be a copolymer comprising various units as stated above. The PAEK may in particular be a PEEK-PEDEK copolymer comprising PEEK units, in particular of formula IIA and/or isomers thereof having in particular the formula IIB, IIC and IID, and PEDEK units, in particular of formula VI and/or isomers thereof, in particular in which the diphenyl groups comprise phenylene groups of 1,3 or 1,4 type.

In addition, defects, end groups and/or monomers may be incorporated in a very small amount into the polymers as described above, without, however, having a negative effect on their performance.

The powder used in the process according to the invention is based on PAEK(s). It therefore generally comprises at least 50% by weight, relative to the total weight of powder, of a single PAEK or of a mixture of PAEKs. In certain embodiments, it comprises at least 75%, or at least 80%, or at least 85%, or at least 90%, or at least 92.5%, or at least 95%, or at least 97.5%, or at least 98%, or at least 98.5%, or at least 99%, or at least 99.5% by weight of PAEK relative to the total weight of the powder.

According to one alternative embodiment, the PAEK-based powder may be a powder based on one of the following polymers: PEEK, PEEKK, PEKEKK, PEEEK, PEDEK or PEEK-PEDEK copolymer as the only PAEK in the powder.

According to another alternative, the PAEK-based powder may in particular be a powder based on PEKK as the only type of the family of PAEKs in the powder. According to certain embodiments, the PEKK may in particular be a mixture of various PEKK copolymers. In particular, the PEKK may be a mixture of PEKK copolymers having a different ratio of units of formula IA and of units of formula IB. According to other embodiments, the PEKK may be a single type of PEKK copolymer.

According to yet another alternative, the PAEK-based powder may also be a powder based on a mixture of polymers from the family of PAEKs. Thus, the powder may in particular be a PEKK-based powder and comprise, in addition to the PEKK, at least one of the following polymers: PEK, PEEKEK, PEEK, PEEKK, PEKEKK, PEEEK, PEDEK, PEEK-PEDEK copolymer with a content of less than 50% by weight of the powder, preferably less than or equal to 30% by weight of the powder.

In the powders based on PEKK(s), the weight proportion of T units, relative to the sum of the T and I units of the PEKK, may range from 0% to 5%; or from 5% to 10%; or from 10% to 15%; or from 15% to 20%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 100%.

Ranges of from 35% to 100%, notably from 45% to 85% and even more specifically from 50% to 80% are particularly suitable. Preferably, the PEKK used has a weight proportion of T units relative to the sum of the T and I units of around 60%.

The choice of the weight proportion of T units relative to the sum of the T and I units is one of the factors which makes it possible to adjust the melting temperature and the rate of crystallization at a given temperature of the PEKK. A given weight proportion of T units relative to the sum of the T and I units can be obtained by adjusting the respective concentrations of the reactants during the polymerization, in a manner known per se.

In the powders based on PEEK-PEDEK copolymer(s), the molar proportion of IIA units, relative to the sum of the IIA and VI units, may range from 0% to 5%; or from 5% to 10%; or from 10% to 15%; or from 15% to 20%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 100%.

Ranges of from 35% to 100%, notably from 45% to 85% and even more specifically from 50% to 80% are particularly suitable.

The choice of the weight proportion of IIA units relative to the sum of the IIA and VI units is one of the factors which makes it possible to adjust the melting temperature and the rate of crystallization at a given temperature of the PEEK-PEDEK copolymer.

Phosphates

A phosphate is either a salt of phosphoric acid or of an ester thereof, or a phosphoric acid ester that is not in salt form. Phosphates have in common a phosphorus atom surrounded by four oxygen atoms in a tetrahedron.

One or more phosphate(s) may be incorporated into the PAEK-based powder.

Preferentially, the phosphate is a salt. This has the advantage in particular of enabling it to be incorporated into the PAEK-based powder in aqueous form.

The phosphate salt may advantageously be chosen from one (or more) phosphate salt(s) of ammonium, sodium, calcium, zinc, aluminum, potassium, magnesium, zirconium, barium, lithium or rare-earth elements.

According to certain embodiments, the phosphate salt(s) is (are) one (or more) organometallic phosphate salt(s).

According to certain embodiments, the organometallic phosphate salt(s) may have the following formula:

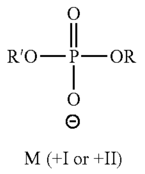

wherein R is identical to or different from R', R and R' being formed by one or more aromatic groups which are optionally substituted by one or more groups having from 1 to 9 carbons, it being possible for R and R' to be bonded to one another or separated by at least one group chosen from the following groups: $-CH_2-$; $-C(CH_3)_2-$; $-C(CF_3)_2-$; $-SO_2-$; $-S-$, $-CO-$; and $-O-$ and M represents an element from group IA or IIA of the Periodic Table.

According to certain embodiments, said at least one phosphate salt is a salt of $H_2PO_4^-$, $$HPO_4^{2-}, PO_4^{3-},$$

or a mixture thereof.

Among the mixtures, the mixture of $$H_2PO_4^- \text{ and } HPO_4^{2-}$$

salts and the mixture of $$HPO_4^{2-} \text{ and } PO_4^{3-}$$

salts are particularly preferred. The counterion of these mixtures is preferentially a sodium ion, a potassium ion or a calcium ion and, more preferably, a sodium ion.

In the embodiments where the phosphate salt comprises only one phosphate, the phosphate salt is advantageously an $H_2PO_4^-$ salt of sodium, potassium or calcium. Preferably, the phosphate salt is monosodium phosphate.

The phosphate, or the mixture of phosphates, is incorporated into the powder in a proportion of greater than or equal to 500 ppm, or greater than or equal to 750 ppm, or greater than or equal to 1000 ppm, or greater than or equal to 1500 ppm, or greater than or equal to 2000 ppm, or greater than or equal to 2500 ppm. Advantageously, the phosphate, or the mixture of phosphates, is incorporated into the powder in a proportion not exceeding 50 000 ppm, or not exceeding 25 000 ppm, or not exceeding 20 000 ppm. In particular, the phosphate, or the mixture of phosphates, can be incorporated into the powder in a proportion of between 1000 ppm and 5000 ppm, or between 5000 ppm and 10 000 ppm, or between 10 000 ppm and 15 000 ppm, or else between 15 000 ppm and 20 000 ppm.

The inventors have demonstrated that the addition of a phosphate or of a mixture of phosphates to a composition based on PAEK(s), in particular in powder form, as described above could be used advantageously to stabilize the color of the composition when the latter is heated at a temperature strictly between the glass transition temperature and the melting temperature of the composition.

It will be considered in particular that an effective stabilization of the color is obtained if the yellowness index of the composition has a variation of less than or equal to 100%, or less than or equal to 90%, or less than or equal to 80%, or less or equal to 70%, or less than or equal to 60%, or less than or equal to 50%, in particular less than or equal to 25%, when the composition is heated at a temperature equal to approximately 20° C. below its melting temperature for a period of seven days under a nitrogen atmosphere.

Likewise, the inventors have also demonstrated that the addition of a phosphate or of a mixture of phosphates to such a composition based on PAEK(s), in particular in powder form, could be used advantageously to stabilize the viscosity of polyaryletherketone(s) (PAEK(s)) in a composition based on polyaryletherketone(s), when the composition is heated at a temperature strictly between its glass transition temperature and its melting temperature.

It will be considered in particular that an effective stabilization of the viscosity is obtained if the viscosity number of the composition, as measured in solution at 25° C. in a 96 wt % sulfuric acid aqueous solution, has a variation of less than or equal to 20%, or less than or equal to 15%, or less than or equal to 10%, in particular less than or equal to 5% and very particularly between −5% and +10%, when the composition is heated at a temperature equal to approximately 20° C. below its melting temperature for a period of seven days under a nitrogen atmosphere.

The stabilization, in particular of the color and of the viscosity of the PAEK(s) of the composition, makes it possible to guarantee a low variation in color and viscosity of the powder based on PAEK(s) after several hours of heating at a temperature strictly between its glass transition temperature and its melting temperature. Objects of homogeneous and uniform color and having homogeneous and uniform mechanical properties may thus be obtained.

Thus, the inventors have proposed improved processes for powder sintering with electromagnetic radiation, using a powder based on PAEK(s) which is, at least in part, recycled.

Powder

The powder comprises at least one PAEK and at least one phosphate.

It may further contain one or more other polymers that do not belong to the family of PAEKs, in particular other thermoplastic polymers.

The powder may also comprise a hydrophilic or hydrophobic flow agent. In certain embodiments, the powder comprises from 0.01% to 0.4% by weight of flow agent, preferably from 0.01% to 0.2% by weight of flow agent and more preferably from 0.01% to 0.1% by weight of flow agent. The powder may for example comprise from 0.01% to 0.05% by weight of flow agent, or from 0.05% to 0.1% by weight of flow agent, or from 0.1% to 0.2% by weight of flow agent, or from 0.2% to 0.3% by weight of flow agent, or from 0.3% to 0.4% by weight of flow agent.

The powder may further comprise additives and/or fillers that are not phosphates.

Among the fillers, mention is made of reinforcing fillers, notably mineral fillers such as carbon black, carbon or non-carbon nanotubes, and fibers (glass, carbon, etc.), which may or may not be milled. The PEKK powder may thus comprise less than 50% by weight of fillers, and preferably less than 40% by weight of fillers relative to the total weight of powder.

Among the additives, mention may be made of stabilizers (light, in particular UV, and heat stabilizers), optical brighteners, dyes, pigments and energy-absorbing additives (including UV absorbers) or a combination of these fillers or additives.

The powder may thus comprise less than 5% by weight of additives, and preferably less than 1% by weight of additives.

The powder according to the invention can be prepared by any known method, making it possible to obtain a homogeneous mixture containing the composition based on PAEK(s) and comprising at least one phosphate, and optionally other additives, fillers or other polymers. Such a method may be chosen from techniques of dry blending (using, for example, a roll mill), melt extrusion, compounding or else wet impregnation or impregnation during the process for synthesizing the polymer.

Preferentially, the powder is prepared by the technique of dry blending or the technique of wet impregnation of a phosphate-free composition based on PAEK(s) with said at least one phosphate. These two methods have the advantage of not heating the composition above its melting temperature. More preferably, the powder is obtained by the wet impregnation technique, which generally enables better dispersion than the dry bending technique.

The powder is suitable for sintering with electromagnetic radiation. This type of powder generally has a particle size distribution, measured by laser diffraction, for example on a Malvern diffractometer, such that the median diameter "d50", on a volumetric basis, is strictly less than 100 μm. "d50" represents the particle diameter value such that the cumulative particle size distribution function on a volumetric basis is equal to 50%. Preferentially, the powder has a particle size distribution of d10>15 μm, 50<d50<80 μm, and 120<d90<180 μm. "d10" and "d90" are respectively the corresponding diameters such that the cumulative function is equal to 10%, and respectively to 90%. The milling processes that make it possible to obtain such powders are known per se. One particularly advantageous process has been described in the application published under number EP 2 776 224.

The powder may have a melting temperature of less than 330° C., preferably less than or equal to 320° C., and more preferably less than or equal to 310° C.

In certain embodiments, the powder intended to be used in a process for the layer-by-layer construction of a three-dimensional object by sintering brought about by electromagnetic radiation, may undergo, prior to its first use, an isothermal heat treatment. In this case, the heat treatment is carried out at a temperature below the melting temperature of the powder and may be useful in the case where several crystalline forms of a PAEK (having different melting temperatures) coexist, which can adversely affect the sintering quality. The duration of such a heat treatment is however typically less than 6 hours. It is generally less than or equal to 4 hours and preferentially less than or equal to 2 hours.

According to the variant in which the PAEK-based powder is a PEKK-based powder, in particular a powder based on PEKK as the only PAEK, a prior isothermal heat treatment can be carried out at a temperature of from 260° C. to 290° C. and preferably 280° C. to 290° C. The isothermal heat treatment prior to the sintering step makes it possible to obtain a powder of stable crystalline morphology, i.e. a powder which does undergo melting until the construction temperature. The duration of the isothermal heat treatment is typically less than 6 hours. It is generally less than or equal to 4 hours and preferentially less than or equal to 2 hours.

In certain embodiments, the powder may have a core-shell structure, in which the melting temperature of the core is higher than the melting temperature of the shell. In these embodiments, the core composition and the shell composition are each based on PAEK(s) and each contain at least one phosphate.

Sintering Process

The powder based on PAEK(s), as described above, is used for a process for the layer-by-layer construction of a three-dimensional object by sintering brought about by electromagnetic radiation in a device 1, such as the one shown diagrammatically in FIG. 1. The powder consists of recycled powder and optionally of virgin powder, as explained below.

The electromagnetic radiation may be, for example, infrared radiation, ultraviolet radiation or, preferably, laser radiation. In particular, in a device 1 such as the one shown diagrammatically in FIG. 1, the electromagnetic radiation may comprise a combination of infrared radiation 100 and laser radiation 200 in combination.

The sintering process is a layer-by-layer manufacturing process for constructing a three-dimensional object 80.

The device 1 comprises a sintering chamber 10 in which are placed a feed tank 40 containing the PAEK-based powder, a horizontal plate 30 for supporting the three-dimensional object 80 in construction and a laser 20.

According to the process, powder is taken from the feed tank 40 and deposited on the horizontal plate 30, forming a thin layer 50 of powder constituting the three-dimensional object 80 under construction. The powder layer 50, under construction, is heated by means of infrared radiation 100 in order to reach a substantially uniform temperature equal to a predetermined construction temperature Tc.

The construction temperature Tc may be lower than the melting temperature Tm of the powder by less than 50° C., preferably by less than 40° C., more preferably by less than 30° C., and more preferably by approximately 20° C. Tc is advantageously more than 10° C. lower than Tm.

Alternatively, Tc may be higher than the glass transition temperature of the powder by less than 70° C., preferably by less than 60° C., more preferably by less than 50° C., preferably by less than 40° C., and more preferably by approximately 30° C. Tc is advantageously more than 20° C. higher than Tg.

The energy required to sinter the powder particles at various points in the powder layer 50 is then provided by laser radiation 200 from the laser 20 that is movable in the plane (xy), in a geometry corresponding to that of the object. The molten powder resolidifies forming a sintered part 55, whereas the rest of the layer 50 remains in the form of unsintered powder 56. Several passes of laser radiation 200 may be necessary in certain cases.

Next, the horizontal plate 30 is lowered along the axis (z) by a distance corresponding to the thickness of one layer of powder, and a new layer is deposited. The laser 20 supplies the energy required to sinter the powder particles in a geometry corresponding to this new slice of the object, and so on. The procedure is repeated until the entire object 80 has been manufactured. The temperature in the sintering chamber 10 of the layers under the layer undergoing construction may be below the construction temperature. However, this temperature generally remains above the glass transition temperature of the powder. It is in particular advantageous for the temperature of the bottom of the chamber to be maintained at a temperature Tb, referred to as "tank bottom temperature", such that Tb is lower than Tc by less than 40° C., preferably less than 25° C. and more preferably less than 10° C. Thus at the end of the construction of the three-dimensional object 80 by powder sintering, the portion of the powder which has not been sintered 56, was subjected during the construction period to a heat treatment of the order of several hours, on average of the order of at least six hours, at a temperature that is variable but is strictly between the glass transition temperature and the melting temperature of the powder.

Once the object 80 has been completed, it is removed from the horizontal plate 30 and the unsintered powder 56 can be screened before being returned, at least partly, into the feed tank 40 to serve as recycled powder.

The term "virgin powder" is understood to mean a powder suitable for being used in a sintering process as described above for the first time.

Conversely, a "recycled powder" is a powder of the same initial composition as the virgin powder and which has undergone a heat treatment, in particular during a previous construction by sintering. Thus, a "recycled powder" is defined here as a powder obtainable by continuous or discontinuous heating, over a period of at least six hours, of a powder, in particular of a virgin powder, of the same composition at a constant or nonconstant temperature, strictly between the glass transition temperature, Tg, and the melting temperature, Tm, of the powder.

In the particular embodiment where the powder has a core-shell structure, the glass transition temperature Tg and the melting temperature Tm of the powder, within the meaning of the invention, must be understood as being respectively the glass transition temperature and the melting temperature of the shell. The recycled powder may originate from the recycling of powder from at least one previous layer-by-layer construction of a three-dimensional object by powder sintering with electromagnetic radiation.

The powder may advantageously be recycled at least twice, or at least three times, or at least five times, or at least ten times, or at least twenty-five times, or at least fifty times, or at least one hundred times.

The recycled powder may be used as is or alternatively as a mixture with other recycled powders or a virgin powder.

Advantageously, the powder used in the sintering process of the invention comprises, by total weight of powder, at least 30%, preferentially at least 40%, and very preferentially at least 50% of recycled powder.

In other words, a powder "recycled n times" for a given construction n, n being an integer greater than or equal to 1, is a powder which may originate from a completed previous construction (n−1).

In the case where n=1, the powder "recycled once" in a construction 1 may originate from the recycling of an initially only virgin powder used in a construction 0.

In the case where n=2, the powder "recycled twice" in a construction 2 may originate from the recycling of: a powder initially only recycled once or an initial mixture of a powder recycled once and virgin powder, used in a construction 1. Generally, for n greater than or equal to 2, the powder "recycled n times" in a construction n may originate from the recycling of: a powder initially only recycled (n−1) times or an initial mixture of a powder recycled (n−1) times and virgin powder, used in a construction (n−1).

Thus, the powder recycled "n times" has undergone, at least in part, heating corresponding to the successive constructions 0, . . . , (n−1). Moreover, the powder recycled "n times" has undergone, in its entirety, at least the heating of the construction (n−1).

The process according to the invention, using a recycled powder, has the advantage that the construction temperature used can be substantially the same as that of a process using only virgin powder.

EXAMPLE

The purpose of the following example is to demonstrate the effects of the addition of phosphate(s) to a composition based on PAEK(s) on the stability of the composition, when the composition is heated at a temperature strictly between its glass transition temperature and its melting temperature. The scope of the invention should not be reduced to merely the illustration of this example.

Several compositions comprising Kepstan® PEKK 6000, PL grade and a monosodium phosphate salt in various proportions were prepared.

Kepstan® PEKK 6000 is a polyetherketoneketone, sold by the company Arkema. It has a weight proportion of T units relative to the sum of the T and I units of 60%. Its melting temperature is between 300° C. and 305° C. Its glass transition temperature is equal to 160° C. The grade used is a powder that has a d50 of 50 μm and that has undergone an isothermal heat pretreatment at 285° C. for 4 hours. It has an initial viscosity number of 0.98 dL/g.

The Kepstan® PEKK 6000 powder was impregnated with phosphate by wet impregnation in an aqueous solution of monosodium phosphate followed by drying of the powder.

A control powder not comprising phosphate and four powders respectively comprising 385 ppm, 775 ppm, 1550 ppm and 2500 ppm of monosodium phosphate salt were prepared. The powders were placed in a medium under nitrogen for 7 days at 285° C. Their yellowness index and also their viscosity were measured at t=0 and at t=7 days.

As shown in FIG. 2, the addition of monosodium phosphate made it possible to mitigate the increase in yellowness index after 7 days (variation of +150% in yellowness index of the control powder compared to variations of less than +100% for the powders respectively comprising 775 ppm, 1550 ppm and 2500 ppm of phosphate).

As shown in FIG. 3, the addition of monosodium phosphate made it possible to limit the increase in viscosity after 7 days (variation of +20% in the viscosity of the control powder compared to variations of less than +15% for the powders respectively comprising 1550 ppm and 2500 ppm of phosphate).

The invention claimed is:

1. A process for the layer-by-layer manufacture of a three-dimensional object by sintering of a powder based on polyaryletherketone(s) (PAEK(s)) with electromagnetic radiation, wherein said powder comprises at least 50% by weight, relative to a total weight of powder, of at least one PAEK and at least one phosphate, said powder being, at least in part, a recycled powder, said phosphate being a phosphorus atom surrounded by four oxygen atoms in a tetrahedron;

said recycled powder being obtainable by continuous or discontinuous heating, over a period of at least six hours, of a powder of a same composition at a constant or nonconstant temperature, strictly between a glass transition temperature, Tg, and a melting temperature, Tm, of the powder.

2. The manufacturing process as claimed in claim 1, wherein the recycled powder is a powder originating from at least one previous layer-by-layer construction of a three-dimensional object by powder sintering with electromagnetic radiation, the sintering of the layers of the previous construction being carried out at a construction temperature Tc.

3. The manufacturing process as claimed in claim 2, wherein at least one portion of the recycled powder originates from at least two recycles of previous layer-by-layer constructions of three-dimensional objects by powder sintering with electromagnetic radiation.

4. The manufacturing process as claimed in claim 2, wherein Tc is between (Tm−50° C.) and (Tm−10° C.), limits included; or where Tc is between (Tg+20° C.) and (Tg+70° C.), limits included.

5. The manufacturing process as claimed in claim 4, wherein the powder originating from at least one previous layer-by-layer construction of a three-dimensional object by powder sintering with electromagnetic radiation, has been subjected to a temperature varying from the construction temperature Tc to a temperature above or equal to (Tc−40° C.), during a construction period of the previous construction.

6. The manufacturing process as claimed in claim 1, wherein said powder comprises, by total weight of powder, at least 30% of recycled powder.

7. The manufacturing process as claimed in claim 1, wherein said at least one phosphate is a salt.

8. The manufacturing process as claimed in claim 7, wherein said phosphate salt is selected from the group consisting of: phosphate salts of ammonium, sodium, calcium, zinc, potassium, aluminum, magnesium, zirconium, barium, lithium, rare-earth elements, and a mixture thereof.

9. The manufacturing process as claimed in claim 8, wherein said phosphate salt has the following formula:

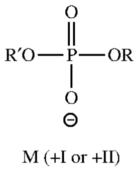

wherein R is identical to or different from R', R and R' being formed by one or more aromatic groups which are optionally substituted by one or more groups having from 1 to 9 carbons, it being possible for R and R' to be bonded to one another or separated by at least one group chosen from the following groups: $—CH_2—$; $—C(CH_3)_2—$; $—C(CF_3)_2—$; $—SO_2—$; —S—, —CO—; and —O— and, wherein M represents an element from selected from sodium, calcium, potassium, magnesium, barium, lithium, and a mixture thereof.

10. The manufacturing process as claimed in claim 7, wherein said phosphate salt is a salt of $H_2PO_4^-$, $$HPO_4^{2-}, PO_4^{3-},$$

or a mixture thereof.

11. The manufacturing process as claimed in claim 7, wherein said phosphate salt is monosodium phosphate.

12. The manufacturing process as claimed in claim 1, wherein said powder comprises at least 75% by weight of PAEK relative to the total weight of powder.

13. The manufacturing process as claimed in claim 1, wherein a proportion of said at least one phosphate in said powder is greater than or equal to 500 ppm.

14. The manufacturing process as claimed in claim 1, wherein said at least one PAEK is selected from the group consisting of: polyetherketoneketone (PEKK), polyetheretherketone (PEEK), polyetheretherketoneketone (PEEKK), polyetherketoneetherketoneketone (PEKEKK), polyetheretheretherketone (PEEEK), polyetherdiphenyletherketone (PEDEK), copolymers thereof and mixtures thereof.

15. The manufacturing process as claimed in claim 14, wherein said at least one PAEK is polyetherketoneketone (PEKK).

16. The manufacturing process as claimed in claim 15, wherein said powder comprises at least two PAEKs and in addition to the PEKK, at least one of the following polymers: PEK, PEEKEK, PEEK, PEEKK, PEKEKK, PEEEK, PEDEK, with a content of less than 50% by weight of the total weight of said composition.

17. The manufacturing process as claimed in claim 1, wherein a virgin powder, which has never been recycled and is capable of being recycled, is obtained by dry blending or by wet impregnation of a phosphate-free composition comprising at least 50% by weight relative to the total weight of composition with said phosphate(s).

18. The manufacturing process as claimed in claim 1, wherein the proportion of said at least one phosphate in said powder is greater than or equal to 1000 ppm.

* * * * *